United States Patent
Junod et al.

(10) Patent No.: US 8,634,554 B2
(45) Date of Patent: Jan. 21, 2014

(54) METHOD TO ENFORCE BY A MANAGEMENT CENTER THE ACCESS RULES FOR A BROADCAST PRODUCT

(75) Inventors: Pascal Junod, Vufflens-La-Ville (CH); Alexandre Karlov, Meyrin (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 328 days.

(21) Appl. No.: 13/119,927

(22) PCT Filed: Sep. 16, 2009

(86) PCT No.: PCT/EP2009/061986
§ 371 (c)(1),
(2), (4) Date: Mar. 18, 2011

(87) PCT Pub. No.: WO2010/031781
PCT Pub. Date: Mar. 25, 2010

(65) Prior Publication Data
US 2011/0164747 A1     Jul. 7, 2011

Related U.S. Application Data

(60) Provisional application No. 61/136,623, filed on Sep. 19, 2008.

(30) Foreign Application Priority Data

Sep. 19, 2008 (EP) .................... 08164674

(51) Int. Cl.
*H04L 29/06* (2006.01)
(52) U.S. Cl.
USPC .......................... 380/210; 380/200
(58) Field of Classification Search
USPC ............... 380/210, 278, 200; 726/4; 713/150
See application file for complete search history.

(56) References Cited

U.S. PATENT DOCUMENTS

| | | | |
|---|---|---|---|
| 6,782,475 B1 * | 8/2004 | Sumner | ........................ 713/163 |
| 2004/0168063 A1 | 8/2004 | Revital et al. | |

(Continued)

FOREIGN PATENT DOCUMENTS

WO    WO 2006/055853    5/2006

OTHER PUBLICATIONS

International Search Report issued in PCT/EP2009/061986, mailed Nov. 3, 2009.
Written Opinion issued in PCT/EP2009/061986, mailed Nov. 3, 2009.

*Primary Examiner* — Jeffrey Pwu
*Assistant Examiner* — Thong Truong
(74) *Attorney, Agent, or Firm* — DLA Piper LLP US

(57) ABSTRACT

A method to enforce by a management center access rules for a broadcast product accessed by an access key, the management center managing a plurality of Boolean positive and negative attributes, comprising the steps: associating one positive Boolean attribute to a receiver entitled to the attribute and loading the same; associating one negative Boolean attribute to a receiver not entitled to the attribute and loading the same; defining at least a second broadcast encryption scheme for the negative Boolean attributes and associating each negative Boolean attribute corresponding decryption key material; expressing access conditions on a product as a Boolean expression by combining at least one positive Boolean attribute and at least one negative Boolean attribute by at least one Boolean conjunction or disjunction; generating and broadcasting at least one cryptogram to a receiver, encrypting the access key with the two combined broadcast encryption schemes according to the Boolean expression.

10 Claims, 1 Drawing Sheet

(56) References Cited

U.S. PATENT DOCUMENTS

| | | |
|---|---|---|
| 2005/0129234 A1* | 6/2005 | Duval .......................... 380/239 |
| 2006/0075423 A1* | 4/2006 | Brique et al. .................. 725/25 |
| 2006/0184796 A1 | 8/2006 | Fahrny |
| 2007/0140488 A1* | 6/2007 | Dharmaji et al. ............. 380/212 |
| 2008/0019517 A1 | 1/2008 | Munguia et al. |
| 2008/0192936 A1 | 8/2008 | Bellwood et al. |
| 2009/0285401 A1* | 11/2009 | Moroney et al. ............. 380/278 |

* cited by examiner

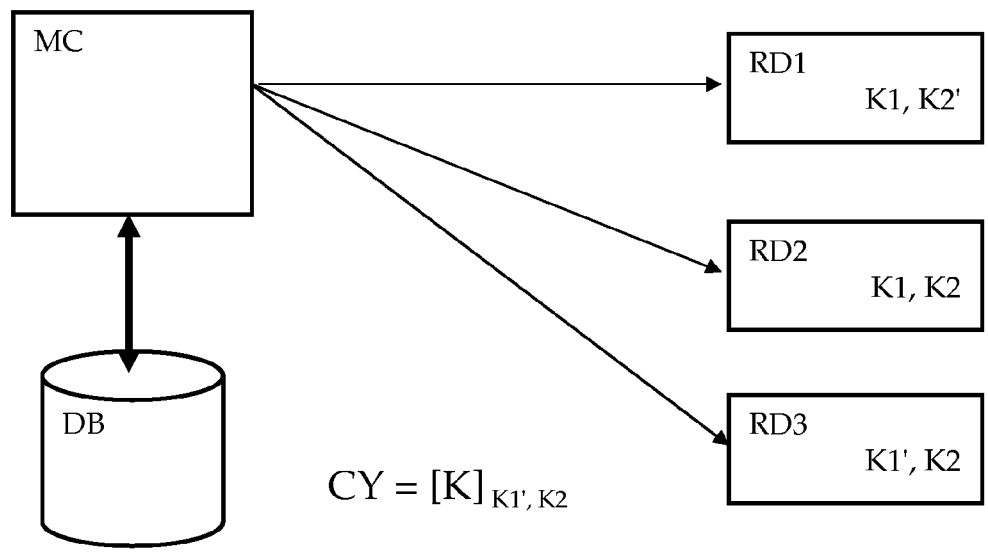

METHOD TO ENFORCE BY A MANAGEMENT CENTER THE ACCESS RULES FOR A BROADCAST PRODUCT

FIELD OF THE INVENTION

This invention refers to the field of broadcast encryption, in particular the way to manage authorization rights in a broadcast system having a management center and a plurality of receiving devices.

INTRODUCTION

In the known standard pay-TV broadcast model, as disclosed in the "EBU Functional Model of a Conditional Access System", EBU technical review, winter 1995, the pay-TV product to be broadcast is encrypted and the keys to decrypt the pay-TV product on the receiving side are placed in Entitlement Control Messages (ECM) sent together with the scrambled pay-TV product. The ECMs are encrypted with a transmission key, which is changed frequently for security reasons.

In addition to the descrambling keys, the ECM carries information on the pay-TV product conditional access rights in the form of access conditions to be enforced on the receiving side.

The individual subscriber conditional access rights (for instance a service subscription right for one month) as well as the transmission keys, are managed and transmitted on an asynchronous way in the form of Entitlement Management Messages (EMM). The EMMs are encrypted with secret keys only known to the receivers.

For a receiving device to be able to receive and decrypt a product, the first step is therefore to receive and decrypt the EMM messages carrying the rights corresponding to the product as well as the EMM messages carrying the transmission keys necessary to decrypt the ECM messages. For that purpose, the receiving device comprises a unique key and the EMM is encrypted by the matching unique key of the receiving device and broadcast so that only this particular device can decrypt the EMM. For that purpose, symmetric or asymmetric keys can be used.

PRIOR ART

Different rights can be loaded into the security means memory of the receiving device, this security means being generally in the form of a smart card, and are then enforced by said security means.

These security means can have different forms, such as smartcard, secure chip, USB dongle or tamper-resistant software in the device.

We consider these security means as secure enough to store at least the transmission key, the unique key pertaining to this receiving device and the right (or rights) associated with this receiving device.

The role of the security means is to receive the ECM and EMM messages, decrypt the ECM using the transmission key and extract the access key (or keys) as well as the access conditions related to this pay-TV product. The security means check if the right matching the access conditions contained in the ECM is present in security means memory and in the positive event, the access key is returned to the receiving device for decrypting the product.

An ECM can contain more that one access condition definition. In this case, according to the policy applied, the security means can check the presence of the rights in its memory and return the access key if at least one of the rights is present (Boolean OR function). According to another policy, the security means can return the access key only if all the rights matching the whole set of access conditions are present in the security means memory (Boolean AND function).

Complex queries on the memory content can be executed as disclosed in WO2004052005. The access key is returned to the receiving device only if the various tests give a positive result. Not only rights per se are taken into account but expiration date or credit status can be used in the entitlement validity decision.

The rights as well as the transmission key can be loaded through EMM messages into the security means memory according to various ways:

At the initialization phase of the receiving device, via a local connection with host device or via the reception of initialization messages sent on the broadcast channel At any time e.g. when the subscriber's data are modified, subscription or cancellation of services, renew of the rights, modification of the services key (including the transmission key).

With the advent of security means made only by software, the risk that this software is compromised is higher than with specific hardware security means.

Broadcast encryption primitives such as the one disclosed in "Collusion Resistant Broadcast Encryption with Short Ciphertexts and Private Keys" by Dan Boneh, Craig Gentry and Brent Waters are an efficient way to securely transmit digital content via a broadcast channel with respect to channel bandwidth, receiver's storage capacity and encryption/decryption complexity. It consists of three algorithms. Setup algorithm, which initializes the system parameters such as decryption key material for the receivers (targets) and an encryption key for the broadcast center. Encrypt algorithm generates a cryptogram for an authorized subset of receivers, so that other receivers outside the authorized subset are unable to decrypt the cryptogram. Decrypt algorithm correctly decrypts the cryptogram provided that the receiver has the decryption key and is in the authorized subset.

PROBLEM TO BE SOLVED

Consider a situation where the center wishes to broadcast premium content to the authorized set of receivers which fulfill a certain criteria or characteristic (or lack thereof). This characteristic might be for instance the subscription to a package of services, the amount of money remaining on the smart card, the ZIP code of the receiver (or other geographic information), chipset properties or any other customer- or device-related information.

The benefit of the present invention is to efficiently address this issue by using two instances of broadcast encryption primitives in parallel.

Contrary to the method disclosed in WO2004052005 which has a comparative functionality, the present invention allows performing right enforcement at the broadcast center (i.e. head-end). This has an advantage over the previous method which enforces rights in the security module (SC) since the security in the former case is based on the difficulty to reverse-engineer (break) a security module, while in our case the security is based on a hard mathematical problem. Also, contrary to the disclosure in WO2004052005 the present invention can handle complex access conditions and policies without any impact for the security of the system.

BRIEF DESCRIPTION OF THE INVENTION

The purpose of this invention is to propose a manner to rely to a lesser extent on the security means of the receiver's security module (SC) to enforce the access conditions defined in the key messages on one hand and to handle complex access conditions based on the characteristic and properties of the receiving device or the user of such a device on the other hand.

It is therefore proposed a method to enforce by a management center the access rules to a broadcast product received by receivers, the access to said product being released by a product key, said management center managing a plurality of subscription packages for which at least one subscription package allows the access to the product, the method comprising the initial steps of:

defining for each subscription package at least a positive key material and a negative key material, for a receiver having subscribed to at least one subscription package, loading the positive key material of said subscription package and the negative key material of the subscription packages for which no subscription was made, In case that said product is accessible by at least a first subscription package and not accessible for at least a second subscription package:

preparing an authorization message for giving access to the product, the product key or a data allowing to retrieve the product key being used to produce a cryptogram, said cryptogram being encrypted by both the positive key material access key of the first subscription package and negative key material of the second subscription package so that the cryptogram allowing to retrieve the product key is accessible only when the positive key material of the first subscription package and negative key material of the second subscription package is present in the receiver.

The particularity of the present method is to define two key materials for a subscription package. One of this key (positive key material) is loaded when the receiver is allowed to said subscription package and the other one (the negative key material) is loaded in a receiver not having access to said subscription package.

The management center first targets an attribute (e.g. set of services or subscription package) and list the possible attributes and for each attribute, key material is determined. By key material, it is meant at least a key associated with this attribute and optionally a right definition.

This invention is based on the fact that for a particular receiving device being entitled to a first subscription package and not to a second subscription package, said receiving device receives the positive key material of the first subscription package and the negative material of the second subscription package.

Thanks to this key material, the key messages can carry complex queries such as allowing access to the product key only if the receiving device is entitled of the first subscription package and not entitled to the second subscription package.

The access key or product key can be used to directly access the product or indirectly access the product, i.e. by using further keys or algorithms in the security module. This access key can be combined with other keys in the same message or in other entitlement control messages such as described in EP1252768, the access key playing the role in this case of a master key.

In an alternate embodiment, the access key is the so-called transmission key that is used to encrypt (or decrypt) the messages containing the control words and the access conditions.

BRIEF DESCRIPTION OF THE DRAWING

The invention will be explained with the help of the attached figure in which a general sketch of the broadcast environment is illustrated.

DETAILED DESCRIPTION OF THE INVENTION

During the initialization of a new subscriber, the security module of its receiver receives messages containing the key material dedicated to this user.

Let's take the example that the management center manages four subscription package, each package containing at least one audio/video service and can comprise a plurality of services. In case that this user has subscribed to a first subscription package, the positive key material of the first subscription package is sent to the receiver for storage into its security module. The management center will also send the negative key material of the other subscription packages that the subscriber as not access to.

Thanks to this structure, it is now possible to define access conditions to a specific broadcast product using the positive and the negative key material. According to an example where the product is accessible to subscriber having subscribe to the first package and not to the second package, the product key i.e. the key to decrypt the product is therefore encrypted by the positive key of the first subscription package and again by the negative key of the second subscription package. A message is formed with this double encrypted product key and sent to the subscribers. Our specific subscriber having access to the first package and not to the second package can then decrypt this double encrypted product key. In case that another subscriber has access to the first and the second package, said subscriber will not possess the negative key of the second subscription package and will unable to decrypt the product key.

The access conditions to the product are therefore enforced by the management center and do not rely on the verification made by the subscriber unit.

The order of encryption i.e. the positive key and then the negative key could be inversed without consequence. The negative key can be used first and the positive key can be used subsequently.

In case that the access condition should impact a third subscription package, the product key can be further encrypted by the positive or negative key of the third subscription package, depending on the fact that the condition is to have or not have access to the third subscription package.

According to an embodiment of the invention, the product key is initially encrypted by a session key. This allows a more flexible way to deal with the positive and negative keys. In case that the positive and negative keys are asymmetric keys, the size of the encrypted material by an asymmetric key is defined by the asymmetric algorithm. This will impact only the size of the session key and leave open the size of the product key. A product key of 96 bits can be used and encrypted by a session key of 128 bits. The session key is thereafter encrypted according to the access condition in lieu of the product key as described above. The message sent to the subscriber's unit will contain the product key encrypted by the session key, and the session key encrypted by positive or negative keys according to the access conditions on subscription packages.

Since a subscriber can change its subscriptions, according to one embodiment of the invention, the positive and negative key materials are renewed regularly, e.g. every month. So that a subscriber has no interest to keep the negative key of a given subscription package when he subscribes to this package. The management center will send to this subscriber the new positive key for the coming month for the subscription packages that he is entitled to, and the new negative key for the coming month for the subscription packages that he is not entitled to. So keeping in the storage means of the subscriber unit the keys of the previous month do not allow it to bypass the access conditions based on a combination of positive and negative keys.

Explanation Of The Figure

In the FIG. 1, the management center MC stores in its database DB a copy of the key materials sent in the receiving devices RD1, RD2, RD3. According to our example, two subscription package B1, B2 have been defined, the first one being related to the positive key material K1 and the negative material K1', the second one being related to the positive key material K2 and the negative material K2'.

The receiving device RD1 being entitled to the subscription package B1 has received the key material K1. Due to the fact that this receiving device RD1 is not entitled to the subscription package B2, the key material K2' was also sent to it.

The receiving device RD2 being entitled to the subscription package B1 and B2, both key material K1 and K2 were sent to this device.

The receiving device RD2 being entitled to the Subscription package B2, the key material K2 was sent to it. Due to the fact that this receiving device RD3 is not entitled to the Subscription package B1, the key material K1' was also sent to it.

In case that the management center MC needs to transmit an access key K to only the receiving devices allowed to the second Subscription package B2 and not allowed to the first Subscription package B1, the cryptogram CY sent to the receiving devices RD will contain the access key combined with the negative key material K1' and the positive key material K2.

In the authorization message containing the cryptogram, another field into the message contains a descriptor of the keys to be used for the decryption. This can be in the form of two bitmap, each active bits defining a subscription package, and one bitmap for the positive keys and the other one for the negative keys. According to the implementation of the invention, it could decided that the positive keys are used first to decrypt the cryptogram and then the negative keys.

The product key can release a single broadcast product, e.g. a film or can release a service for a day or a month.

The subscription package can refer to a plurality of services or a single service. The invention thus allows to define the access rule of this product by combining the access to the channel 3 (first subscription package) and not the channel 6 (second subscription package).

The invention claimed is:

1. A method to enforce, by a management center, access rules to a broadcast product received by receivers, the method comprising:

preparing, by a management center processor, an authorization message for giving access to a product accessible by a least a first subscription package and not accessible by at least a second subscription package, the access to said product being released by a product key, said management center managing a plurality of subscription packages for which at least one subscription package allows the access to the product, each of the subscription packages having at least a positive key material and a negative key material, the positive key material comprising at least a positive key and being intended for receivers that have subscribed to the subscription package, the negative key material comprising at least a negative key and being intended for receivers that have not subscribed to the subscription package, each receiver that has access to a subscription package having stored therein a positive key material of said subscription package and the negative key material of the subscription packages for which no subscription was made, the product key or a data allowing retrieval of the product key being used to produce a cryptogram, said cryptogram being encrypted by the positive key of the first subscription package and the negative key of the second subscription package so that the cryptogram allowing retrieval of the product key is accessible only when both the positive key material of the first subscription package and negative key material of the second subscription package are present in the receiver.

2. The method of claim 1, in which the cryptogram is the product key.

3. The method of claim 2, in which the cryptogram is generated by sequentially encrypting the cryptogram by at least one negative key and at least one positive key.

4. The method of claim 2 in which the authorization message comprises identification information describing the subscription packages used for the encryption.

5. The method of claim 1, in which the cryptogram is a session key, the product key being encrypted by the session key, this method comprising the step of adding the encrypted product key into the authorization message.

6. The method of claim 5, in which the cryptogram is generated by sequentially encrypting the cryptogram by at least one negative key and at least one positive key.

7. The method of claim 5 in which the authorization message comprises identification information describing the subscription packages used for the encryption.

8. The method of claim 1, in which the cryptogram is generated by sequentially encrypting the cryptogram by at least one negative key and at least one positive key.

9. The method of claim 8 in which the authorization message comprises identification information describing the subscription packages used for the encryption.

10. The method of claim 1 in which the authorization message comprises identification information describing the subscription packages used for the encryption.

* * * * *